United States Patent
Feibig et al.

(10) Patent No.: US 6,952,560 B2
(45) Date of Patent: Oct. 4, 2005

(54) TUNED ANTENNA RESONANT CIRCUIT OF A PASSIVE TRANSPONDER

(75) Inventors: Cordula Feibig, Neckarsulm (DE); Ulrich Friedrich, Ellhofen (DE)

(73) Assignee: ATMEL Germany GbmH, Heilbronn (DE)

( * ) Notice: Subject to any disclaimer, the term of this patent is extended or adjusted under 35 U.S.C. 154(b) by 278 days.

(21) Appl. No.: 10/145,160

(22) Filed: May 13, 2002

(65) Prior Publication Data
US 2002/0171602 A1 Nov. 21, 2002

(30) Foreign Application Priority Data
May 18, 2001 (DE) .......................................... 101 24 222

(51) Int. Cl.⁷ .............................. H04B 5/00; H04Q 5/22
(52) U.S. Cl. ..................... 455/41.1; 455/19; 340/572.5; 340/10.1; 343/700 MS
(58) Field of Search ............................. 340/572.1, 10.1, 340/10.5, 572.5, 572.7; 455/19, 215, 344, 41.1, 41.2; 343/895, 700 MS

(56) References Cited

U.S. PATENT DOCUMENTS

| 5,583,819 A | * 12/1996 | Roesner et al. .......... 340/10.51 |
| 6,229,442 B1 | 5/2001 | Rolin et al. |
| 6,281,794 B1 | * 8/2001 | Duan et al. ............... 340/572.1 |
| 6,424,315 B1 | * 7/2002 | Glenn et al. ................. 343/895 |

FOREIGN PATENT DOCUMENTS

| DE | 19614455 | 10/1997 |
| DE | 19755250 | 7/1999 |
| DE | 19811489 | 9/1999 |
| DE | 19818968 | 11/1999 |
| WO | WO98/40846 | 9/1990 |
| WO | WO 98/03938 | 1/1998 |
| WO | WO98/03938 | 1/1998 |

OTHER PUBLICATIONS

Klaus Finkenzeller, RFID Handbuch, "Grundlagen und praktische Anwendungen induktiver Funkanlagen, Transponder und kontakloser Chipkarten", Carl Hanser Verlag, Muenchen Wein, Federal Republic of Germany, 2$^{nd}$ Ed., 2000, pp. 121.

* cited by examiner

Primary Examiner—Edward F. Urban
Assistant Examiner—Blane J. Jackson
(74) Attorney, Agent, or Firm—W. F. Fasse; W. G. Fasse

(57) ABSTRACT

A tuned antenna resonant circuit substantially increases the range of a passive transponder in a high-frequency electromagnetic carrier field, in that the real and imaginary parts of the impedance associated with the contact surface of the antenna contact are minimized and the energy absorbed from the carrier field by a serial resonant circuit is used to the greatest possible extent for generating the supply voltage for the integrated circuit of the transponder.

18 Claims, 2 Drawing Sheets

— State of the art

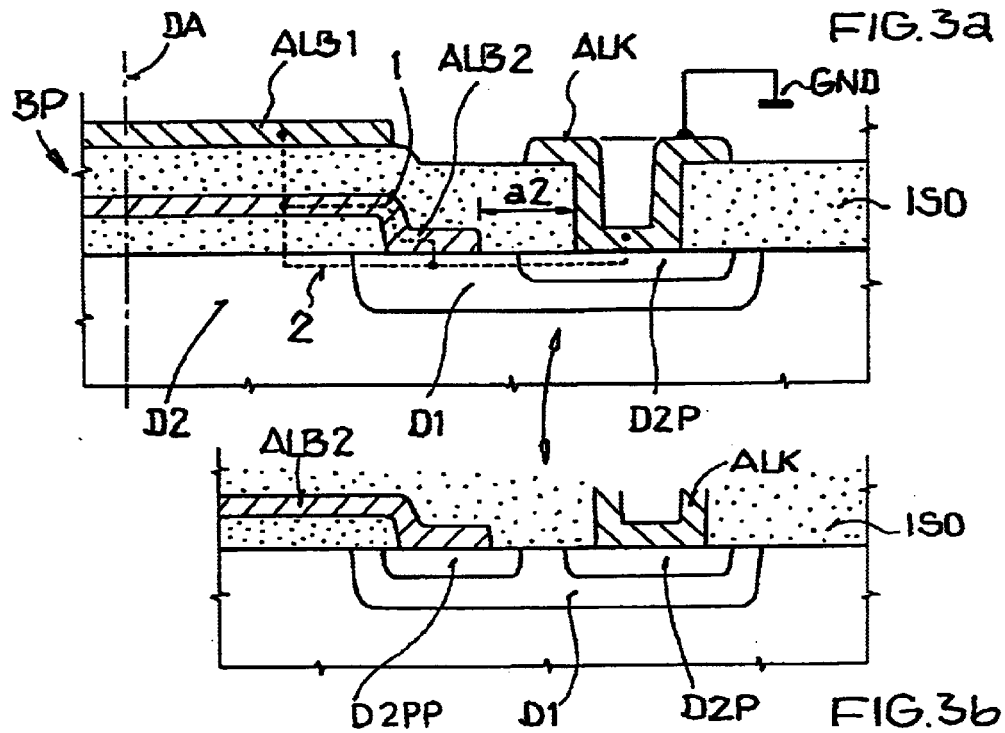
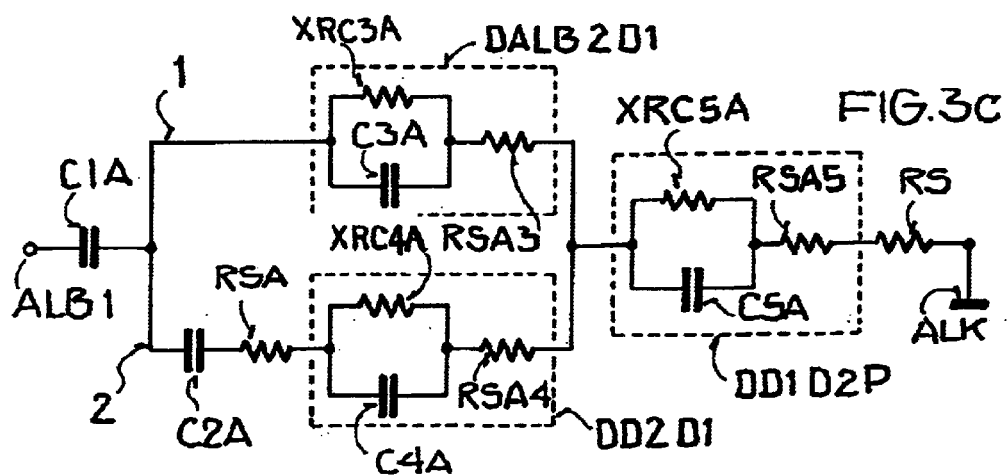

TUNED ANTENNA RESONANT CIRCUIT OF A PASSIVE TRANSPONDER

BACKGROUND

1. Field of the Invention

The present invention relates to a tuned antenna resonant circuit of a passive transponder.

2. Description of the Related Technology

Passive transponders are used in the field of contactless communication for identification (RFID). For this purpose, the carrier wave transmitted by the base station is modulated by the transponder. As passive transponders do not have their own power supply, the energy for the integrated circuit of the passive transponder has to be drawn from the carrier wave by absorption modulation. In the currently used passive 125 kHz systems, this is achieved in the electromagnetic near-field region by an inductive coupling. The energetic range achieved in this way lies in the range from a few cm to around 0.5 m and is dependent upon the prevailing national HF regulations. With the further increasing security requirements placed upon the identification, ever higher data transmission rates are required in order to maintain short identification times. This can only be achieved with high carrier frequencies in the UHF (868 MHz) or microwave (2.45 GHz) ranges. Dipole antennas are usually used for these frequencies. The objective of the development in this field is to achieve long ranges with passive systems and acceptable transmit powers of the base station.

From HF technology it is known, as described for example in RFID Handbook 2nd edition 2000, p.121, that the length of the dipole antenna has to be matched to the wavelength of the sender in order to draw energy from the field of the sender. A complete absorption of the received electromagnetic wave is achieved by matching the impedance to the wave impedance defined by the design of the antenna. If the transponder antenna is located at a fairly long distance from the sender, the antenna voltage resulting therefrom is too low to generate a supply voltage for the transponder by a simple rectification. Because of the HF regulations in the European countries, the ranges of existing UHF transponders lie below one meter.

SUMMARY OF THE INVENTION

The object of the present invention is to provide a tuned antenna resonant circuit of a passive transponder by means of which the range of a passive transponder is increased in the case of a high-frequency electromagnetic carrier field. The second object is to provide a semiconductor arrangement for implementing such a tuned antenna resonant circuit.

The first above-mentioned object has been achieved according to the invention in a tuned antenna resonant circuit of a passive transponder, the operating energy of which is capacitively drawn from a high-frequency electromagnetic carrier field. The arrangement includes a semiconductor body with an integrated circuit with a signal part with reference potential connection, and an antenna arrangement arranged on a substrate. The antenna arrangement is linked to the integrated circuit via a contact surface connected on the semiconductor body. The antenna arrangement forms a serial resonant circuit with an input capacitor of the integrated circuit. Parasitic, capacitive and resistive parts, which form a current path between the contact surface and the reference potential, are reduced in order to raise the quality of the antenna resonant circuit. The current path is divided into a first current path and a second current path at at least one point by a series connection and a parallel connection of the capacitive and resistive parts. The parallel connection of a low capacitance of low quality and a low capacitance of high quality is connected in series to a first capacitance of high quality.

The second above-mentioned object has been achieved according to the invention in a semiconductor arrangement for implementing a tuned antenna resonant circuit of a passive transponder, the operating energy of which is capacitively drawn from a high-frequency electromagnetic carrier field. The arrangement includes a semiconductor body with an integrated circuit with a signal part with reference potential connection, and an antenna arrangement arranged on a substrate. The antenna arrangement is linked to the integrated circuit via a contact surface connected on the semiconductor body. The antenna arrangement forms a serial resonant circuit with an input capacitor of the integrated circuit. Parasitic, capacitive and resistive parts, which form a current path between the contact surface and the reference potential, are reduced in order to raise the quality of the antenna resonant circuit. The semiconductor arrangement includes a first conductive layer as the contact surface for connecting the antenna arrangement to the integrated circuit, an insulating layer, a first zone of a first conductivity type, a second zone of a second conductivity type, and a third highly doped zone of the second conductivity type, which links a contact at a reference potential to a semiconductor substrate. A second conductive layer, the lateral extent of which is greater than the extent of the first conductive layer, is arranged within the insulating layer. The second conductive layer has a connection to the first zone in order to form a Schottky diode. The first zone surrounds the third highly doped zone.

According to this, the essence of the invention consists of increasing the range of a passive transponder by making the operational energy capacitively absorbed from a high-frequency electrical field by means of a serial resonant circuit exclusively available to an input part of the transponder for generating a supply voltage for the integrated circuit. The parasitic capacitive and resistive parts, which form a current path between the contact surface (BP) and the reference potential, are reduced in order to increase the quality of the antenna resonant circuit, in which the input part of the transponder, which has a semiconductor body with an integrated circuit with a signal part with reference potential connector, and which has an antenna arrangement arranged on a substrate, and the antenna arrangement is linked to the integrated circuit via a contact surface connected on the semiconductor body, and in which the antenna forms a serial resonant circuit with the input capacitance of the integrated circuit.

The advantage of the new circuit is that the high voltage values generated from the very low antenna voltage by means of the serial resonant circuit are not absorbed by parasitic, capacitive and resistive parts connected to the contact surface. The power absorbed by the antenna is thus available to the input part of the integrated circuit for generating the supply voltage. As the serial resonant circuit only has a very low inductance, reducing the capacitive part (imaginary part) of the contact surface enables the quality of the signal part to be raised. In the case of passive RFID systems, the range is significantly increased by the improved efficiency of the receiver part of the transponder.

In a development of the circuit, it is advantageous to divide the current path between the contact surface and the reference potential at at least one point into a first current path and a second current path by means of a series connection and a parallel connection of capacitive and resistive parts, so that a parallel connection of low capacitance of low quality, the value of which preferably lies in the range of a few fF (10e–15 Farad), and a low capacitance of high quality, the value of which preferably lies in the range of a few fF, is circuit-connected in series to a first capacitance of high quality.

In another development of the circuit, the low capacitances are produced by means of diodes, as the pn junctions needed for the manufacture of diodes can be easily realized in the manufacturing process of the integrated circuit. Furthermore, spatially bounded pn junctions can be manufactured with a low capacitance value.

Furthermore, it is advantageous to create the first capacitance, which needs a high quality, by implanting a conductive layer in an insulating layer lying under the contact surface.

BRIEF DESCRIPTION OF THE FIGURES

The invention is described in the following by means of example embodiments in conjunction with the drawings, They show:

FIG. 2a a cross-section through a contact surface for an antenna connector within an integrated semiconductor arrangement according to the previous state-of-the-art, and FIG. 2b the equivalent HF circuit diagram of the contact surface of FIG. 2a, and FIG. 3a a cross-section through a contact surface for an antenna connector in which the real and imaginary parts linked to the contact surface are suppressed by means of a Schottky diode arrangement, and FIG. 3b a cross-section through a contact surface in which, in contrast to FIG. 3a, the Schottky diode arrangement is replaced by a conventional diode arrangement, and FIG. 3c the equivalent HF circuit diagram for the cross-section shown in FIG. 3a.

DESCRIPTION OF THE PREFERRED EMBODIMENTS

Figure 1:
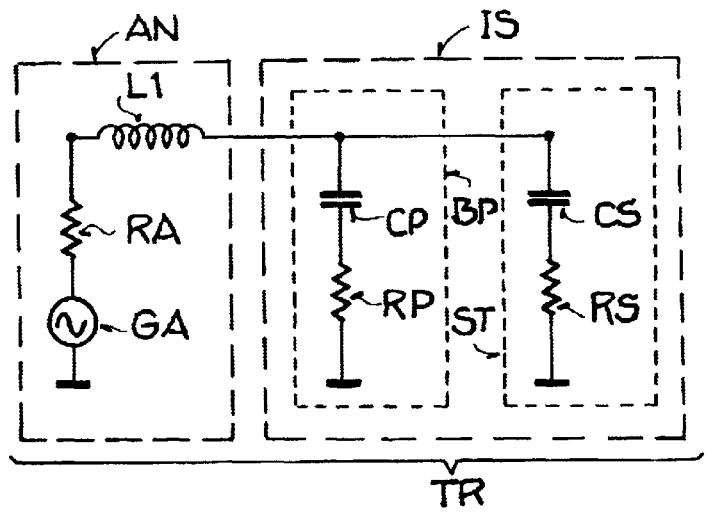
FIG. 1 an equivalent HF circuit diagram of an input part of a transponder.

The equivalent HF circuit diagram shown in FIG. 1 describes the structure of a receiver part of a passive transponder TR for drawing energy by absorption from a high-frequency electromagnetic carrier field of a base station (not shown). The transponder TR consists of an antenna AN and an integrated circuit IS which are both arranged in a common enclosure (not shown). The antenna AN is linked to the integrated circuit IS by means of a contact surface BP and a bonding wire, whereby the contact surface BP is linked to a signal part ST within the integrated circuit IS. The antenna AN lies in series to a parallel connection consisting of the contact surface BP and the signal part ST. The task of the signal part ST, which contains, for example, a voltage doubling circuit, is to generate a supply voltage for the integrated circuit IS by means of the energy absorbed by the antenna AN.

The circuit arrangement of the equivalent circuit diagram is explained in more detail in the following. In the equivalent circuit diagram, the antenna AN consists of an alternating voltage generator GA, which is connected to the reference potential, and a series resistor RA. Furthermore, the series resistor RA is linked to a coil L1 which is connected in series with the parallel connection of the contact surface BP and the signal part ST. The contact surface BP consists of a series connection comprising a capacitor CP and a resistor RP linked to the reference potential. The signal part ST can be represented by a series connection of a capacitor CS and a load resistor RS connected to the reference potential.

The principle of operation of the equivalent circuit diagram is explained in the following. The alternating voltage generator GA represents the energy absorbed by the antenna AN from the carrier field of the base station (not shown), which in the form of an alternating voltage excites the series resonant circuit, which is formed by the resistor RA, the coil L1, and the capacitors CP and CS, and the resistors RP and RS. The loss arising in the antenna AN during the excitation is described by the resistor RA, the phase shift between current and voltage in the antenna by the coil L1. In a description of the alternating voltage, the loss is represented as a real part and the phase shift as an imaginary part. Furthermore, the contact surface BP has an imaginary part, represented by the capacitor CP, and a real part, represented by the resistor RP. The signal part ST also has an imaginary part, represented by the capacitor CS, and a real part, represented by the resistor RS. In order to generate the greatest possible voltage from the energy absorbed from the electromagnetic field, the resonant frequency of the series resonant circuit is tuned to the carrier frequency at either 868 MHz or 2.45 GHz. In accordance with the resonance condition determined by the Thomson equation, the total capacitance of the two capacitors CP and CS and the inductance of the coil L1 must be adequate for the resonance condition. The excitation voltage of the alternating voltage generator GA, which lies in the range of a few $\mu$V, is increased excessively by the series resonant circuit in proportion to the quality of the series resonant circuit. In order to achieve a large overvoltage, the attenuation, that is the sum of the real parts, must be low and the ratio of the imaginary parts of inductance and capacitance must be high in order to make the whole of the energy drawn from the carrier field available for generating a supply voltage to the signal part at a high voltage level. As the inductance value of the coil L1 is low, the capacitance values of the capacitors CP and CS must have very low values in the femto range in order to tune the series resonant circuit to the resonant frequency of the carrier frequency, that is the capacitance CP (imaginary part) linked to the contact surface BP must be reduced. Moreover, the real part linked to the contact surface BP must be very small in order to achieve a high quality in the series resonant circuit and to make the absorbed energy available to the signal part ST, represented by the resistor RS, for generating the supply voltage for the integrated circuit IS.

Figure 2A:
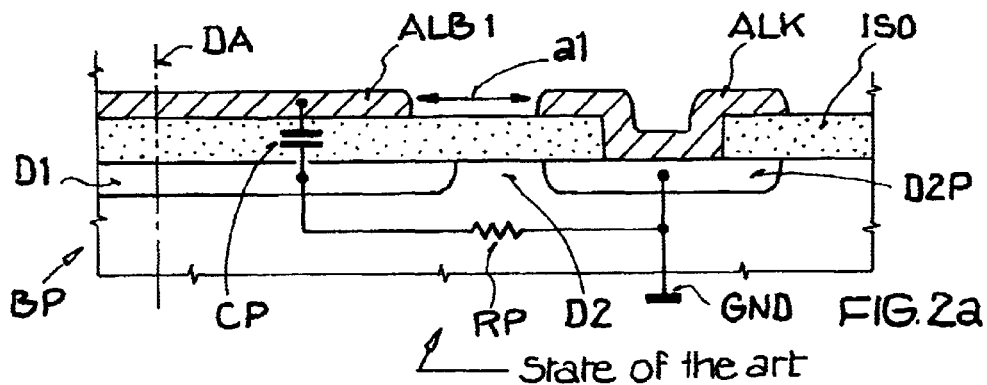

The cross-section through a contact surface within an integrated semiconductor arrangement as represented in FIG. 2a shows the previous state-of-the-art. The identifier DA denotes a mirror axis, that is the representation shown is symmetrical to the axis DA. The function of the contact surface is to make a bonding surface available to connect the antenna AN to the integrated circuit IS.

The structure of the cross-sectional view is explained in the following in conjunction with a simplified consideration of the alternating voltage. An insulating layer ISO, which insulates the contact surface ALB1 from an underlying, low-doped zone D1 of a first conductivity type, is formed under the contact surface ALB1 on a semiconductor body made of silicon, which lies in an uppermost metal level. A low doped zone D2 of the second conductivity type, which is in general described as substrate doping, adjoining zone D1 denotes the reference potential and is connected to a contact ALK by means of a highly doped zone D2P, of the second conductivity type. In order to ensure adequate process reliability in the manufacture of the integrated circuit IS, a large minimum distance a1, lying in the range of some 10 μm, must be maintained between the contact surface ALB1 and the contact ALK, and this determines the length of the zone D2 between the zone D1 and the zone D2P. In a simplified consideration of the alternating voltage, the layer sequence consisting of the contact surface and the zone D1 corresponds to a capacitor with a capacitance value CP, in which the low doped zone D1 of the opposite conductivity type to that of the substrate doping has the effect that the capacitive contribution CP of the contact surfaces is not very great. A resistor RP lies in series with the capacitor CP and has a high value as a result of the long length of the zone D2 in combination with the low doping.

Figure 2B:
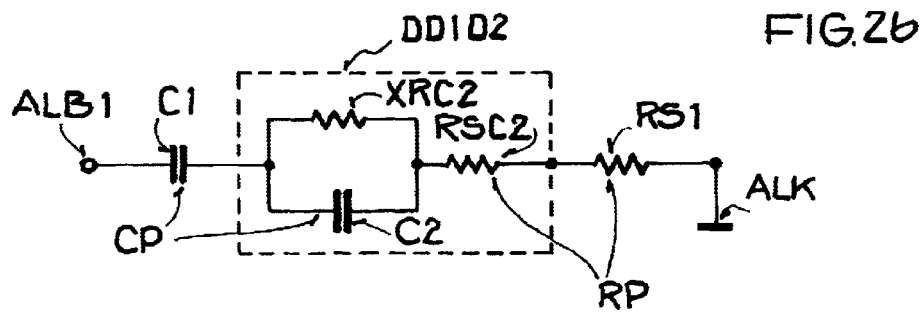

The alternating voltage of the layer structure shown in FIG. 2a is discussed in detail in the following by means of the equivalent HF circuit diagram shown in FIG. 2b. The contact surface ALB1 and the zone D1 form a capacitor with the capacitance C1. Connected in series to this latter there is a diode DD1 D2, which is formed by the boundary surface of the zones D1/D2, and a resistor RS1, which results from the length of the zone D2 between the diode DD1D2 and the contact ALK. In the equivalent HF circuit diagram, the diode DD1D2 is shown as a parallel connection consisting of a resistor XRC2 and a capacitor C2, and a resistor RSC2 connected in series to them. The total capacitance CP is determined by the sum of the capacitance values C1 and C2, the series resistor RP is given by the sum of the resistors RSC2 and RS1. Despite the low doping of zone D1 and the series connection of the capacitances C1 and C2, the capacitance value CP is very high and lies in the range of 40 fF because the zone D1 has a large and the diode DD1D2 a very large boundary surface. As a result of the large boundary surface, the resistor XRC2 and the resistor RSC2 are small despite the low doping of the zone D1, that is the capacitance has a large loss contribution. On the other hand, the resistor RS1 and thus the resistor RP are very large as a result of the great length and low doping of zone D2. As the contribution of the real part is thus large, a substantial part of the energy absorbed by the antenna is lost through the contact surface. Moreover, the large capacitance value gives rise to a high imaginary part and, in conjunction with the low inductance value, makes it difficult for the resonant frequency of the series resonant circuit to be tuned to the carrier frequency. The energetic range of the passive transponder cannot be increased with acceptable expenditure without a drastic reduction of the real and imaginary parts linked to the contact structure.

The layer structure represented in FIG. 3a shows an arrangement for realizing the invention with which, within a conventional manufacturing process of an integrated circuit, the real and imaginary parts connected to the contact surface are very much reduced by an advantageous layer structure, so that the physical parameters of the series resonant circuit determine the contributions of the signal part ST.

As explained in connection with FIG. 2, the axis DA is mirror-symmetrical. The structure is explained in the following, in which, building upon the explanations provided in conjunction with FIG. 2, only the differences are described. Underneath the contact surface ALB1, a second conductive layer ALB2, the size of which is matched to the contact surface ALB1, is introduced within the insulating layer in order to achieve good screening. The layer ALB2 is connected laterally to the zone D1 in order to thus create a Schottky diode DALB2D1. The zone D1 completely surrounds the zone D2P, which represents a connector doping for the contact ALK. In contrast to the distance a1 in FIG. 2a, the distance a2 between the contact ALK and the conductive layer ALB2 is significantly less and lies in the range of about 1 μm. The total length of the zone D1 is determined by the width of the connection of the layer ALB2 and a distance a2, which is given by the distance between the layer ALB2 and the reference potential connection ALK. For the description of the current flow in an equivalent HF circuit diagram, a differentiation is made between a first current path 1 and a second current path 2 which are switched parallel to one another.

The layer structure shown in FIG. 3b presents an alternative embodiment, in which the Schottky diode DALB2D1 shown in FIG. 3a is replaced by a standard model of a diode DD2PD1, by an additional zone D2P being arranged underneath the contact area of the metallic conductive layer ALB2. In place of the Schottky diode, a conventional diode is formed by the boundary surfaces of the zones D2P and the zone D1. This is advantageous if the metalization process within the manufacturing process does not allow the formation of a metal semiconductor junction, but good HF characteristics are nevertheless required. As a result of the small boundary surface of the doping zones D2P and D1, the diode DD2PD1 has a low capacitance value. Moreover, the length of the zone D1 remains substantially unchanged. In the HF description shown in 3c, the equivalent circuit diagram of the diode DD2PD1 corresponds to the Schottky diode DALB2D1 in FIG. 3a.

The equivalent HF circuit diagram shown in FIG. 3c describes the layer structure shown in FIG. 3a. The contact surface ALB1 and the layer ALB2 together with the layer ISO form the capacitance C1A. In series to this, lies the parallel connection consisting of the current path 1 and the current path 2. The current path 1 consists of the Schottky diode DALB2D1. In the equivalent circuit diagram, the Schottky diode DALB2D1 comprises a capacitor C3A, which lies parallel to a resistor XRC3A, and a resistor RS3A lying in series to the parallel connection. A low capacitance value with a high quality is achieved by the metal semiconductor contact. A capacitance C2A, which is formed by the layer ALB2 and the zone D2 together with the zone ISO, lies in the current path 2 in series with a resistor RSA, which is determined by the layer resistance of the zone D2, and in series with the diode DD2D1 which results from the boundary surface of the zones D1/D2. In the equivalent circuit diagram, the diode DD2D1 comprises a capacitor C4A, which is switched parallel to a resistor XRC4A, and a resistor RSA4 lying in series to the parallel connection. Both current paths pass through the layer D1 which has a negligible resistance because of the small lateral extent. The diode DD1D2P then lies in series. In the equivalent circuit diagram, the diode DD1D2P comprising a capacitance C5A, which lies parallel to a resistor XRC5A, in which a resistor RS5A lies in series to the parallel connection, and the capacitance C5A has a low dissipative resistance and a high quality as a result of the small boundary surface and the high doping of the zone D2P. Moreover, the contact ALK is represented by a resistor RS, the resistance of which is very low as a result of the metallic conductive layer.

The principle of operation is explained in the following. In order to suppress the imaginary part of the contact surface, comprising the contribution of the capacitors, small capacitances C3A and C5A with high quality are switched in series with the large capacitance C1A in the current path 1. In particular, the capacitance C3A, which is derived from the equivalent circuit diagram of the Schottky diode, has a very low capacitance value in the range of a few fF. Furthermore, the real part, that is the losses through the series resistor, is also suppressed to the greatest possible extent in current path 1 because both the contributions of the metallic conductive layers ALB2 and ALK are negligible, and also the series resistance comprising the contribution of the zone D1 is also very low because of the very short distance a2. Furthermore, the series resistor RSA lying in current path 2 is able to be made high by low doping in comparison to the series resistance of the metallic conductive layer ALB2 lying in current path 1. However, as path 2 lies parallel to path 1, the relatively large real part of the current path 2 is suppressed. Furthermore, as a result of the low doping of the zones D1 and D2, the capacitance of the capacitor C4A is low despite the relatively large boundary surface, and at the same time it has a very poor quality in comparison to the capacitance C3A resulting from the Schottky diode. The contribution to the imaginary part is thus suppressed by current path 2. The HF current flowing through current path 2 is thus negligible. In total, the small real and imaginary parts of the components lying in current path 1 thus determine the contribution of the contact surface to the real and imaginary parts of the series resonant circuit. As the contributions of the contact surface are extremely small, they may be ignored in comparison to the contributions given by the signal part ST of the integrated circuit IS.

As no changes to the arrangement of the individual components arise from the layer structure shown in FIG. 3b, the explanations given in connection with the drawing documentation of FIG. 3c also apply to the layer structure shown in FIG. 3b.

What is claimed is:

1. A tuned antenna resonant circuit of a passive transponder, the operating energy of which is capacitively drawn from a high-frequency electromagnetic carrier field, and which has a semiconductor body with an integrated circuit (IS) with a signal part (ST) with reference potential connection, which has an antenna arrangement arranged on a substrate, the antenna arrangement is linked to the integrated circuit (IS) via a contact surface (BP) connected on the semiconductor body, in which the antenna arrangement (AN) forms a serial resonant circuit with an input capacitor of the integrated circuit (IS), wherein parasitic, capacitive and resistive parts, which form a current path between the contact surface (BP) and the reference potential, are reduced in order to raise the quality of the antenna resonant circuit, wherein the current path is divided into a first current path and a second current path at at least one point by means of a series connection and a parallel connection of the capacitive and resistive parts, and wherein the parallel connection of a low capacitance of low quality and a low capacitance of high quality is connected in series to a first capacitance of high quality.

2. The tuned antenna resonant circuit according to claim 1, wherein the low capacitances comprise diodes.

3. The tuned antenna resonant circuit according to claim 1, further comprising an insulating layer and a conductive layer (ALB2), which together with the contact surface (BP) forms a capacitor with high quality, and which is implanted in the insulating layer (ISO) lying under the contact surface (BP).

4. The tuned antenna resonant circuit according to claim 1, wherein the low capacitance of low quality and the low capacitance of high quality each respectively have a respective capacitance value of a few femtofarads.

5. A semiconductor arrangement for implementing a tuned antenna resonant circuit of a passive transponder, the operating energy of which is capacitively drawn from a high-frequency electromagnetic carrier field, and which has a semiconductor body with an integrated circuit (IS) with a signal part (ST) with reference potential connection, which has an antenna arrangement arranged on a substrate, the antenna arrangement is linked to the integrated circuit (IS) via a contact surface (BP) connected on the semiconductor body, in which the antenna arrangement (AN) forms a serial resonant circuit with an input capacitor of the integrated circuit (IS), wherein parasitic, capacitive and resistive parts, which form a current path between the contact surface (BP) and the reference potential, are reduced in order to raise the quality of the antenna resonant circuit, wherein the semiconductor arrangement includes a first conductive layer (ALB1) as the contact surface (BP) for connecting the antenna arrangement (AN) to the integrated circuit (IS), an insulating layer (ISO), a first zone (D1) of a first conductivity type, a second zone (D2) of a second conductivity type, and a third highly doped zone (D2P) of the second conductivity type, which links a contact (ALK), which has a reference potential, to a semiconductor substrate, wherein a second conductive layer (ALB2), the lateral extent of which is greater than the extent of the first conductive layer (ALB1), is arranged within the insulating layer (ISO), and the second conductive layer (ALB2) has a connection to the first zone (D1) in order to form a Schottky diode, and the first zone (D1) surrounds the third highly doped zone (D2P).

6. The semiconductor arrangement according to claim 5, wherein a fourth zone (D2PP) of the second conductivity type, which is surrounded by the first zone (D1), is arranged under a connector area of the second conductive layer (ALB2).

7. A passive transponder arrangement adapted to extract an operating energy therefor from a received high-frequency electromagnetic carrier field, comprising:

a semiconductor body including an integrated circuit with a signal circuit part that includes an input capacitor and is connected to a reference potential connection; and an antenna arrangement arranged on a substrate and connected to said integrated circuit via a contact surface provided on said semiconductor body;

wherein:

said antenna arrangement and said input capacitor together form a serial resonant circuit;

a current path including capacitances and resistances is formed between said contact surface and said reference potential connection;

said current path includes a first current sub-path and a second current sub-path connected parallel to each other, and a serial path connected in series with said first and second current sub-paths;

said first current sub-path includes a first capacitance among said capacitances and a first resistance among said resistances, said second current sub-path includes a second capacitance among said capacitances and a second resistance among said resistances, and said serial path includes a third capacitance among said capacitances; and compared to one another, said first capacitance is a low capacitance of high quality, said second capacitance is a low capacitance of low quality, and said third capacitance is a capacitance of high quality.

8. The passive transponder arrangement according to claim 7, wherein said first capacitance and said second capacitance each respectively have a capacitance value of a few femtofarads.

9. The passive transponder arrangement according to claim 7, wherein said first resistance is connected parallel to said first capacitance in said first current sub-path, said second resistance is connected parallel to said second capacitance in said second current sub-path, said first current sub-path further includes a first further resistance among said resistances connected in series with said first resistance and said first capacitance, said second current sub-path further includes a second further resistance among said resistances connected in series with said second resistance and said second capacitance, and said serial path further includes further ones of said resistances respectively connected in parallel and in series with said third capacitance.

10. The passive transponder arrangement according to claim 7, having a first diode structure comprising said first capacitance and a second diode structure comprising said second capacitance.

11. The passive transponder arrangement according to claim 10, wherein said first diode structure is a Schottky diode structure formed by a first junction between a metal structure and a semiconductor region, and said second diode structure is a semiconductor-semiconductor diode structure formed by a second junction between two semiconductor regions.

12. The passive transponder arrangement according to claim 10, wherein said first and second diode structures are each respectively formed by a respective junction between two respective semiconductor regions.

13. The passive transponder arrangement according to claim 7, wherein a first capacitance contribution of said first current sub-path is significantly lower than a second capacitance contribution of said second current sub-path so that said first capacitance contribution dominates said second capacitance contribution and determines an overall capacitance of said current path, and wherein a first resistance contribution of said first current sub-path is significantly lower than a second resistance contribution of said second current sub-path so that said first resistance contribution dominates said second resistance contribution and determines an overall resistance of said current path.

14. The passive transponder arrangement according to claim 13, wherein said overall capacitance and said overall resistance of said current path are negligibly small compared to a capacitance and a resistance of said signal circuit part of said integrated circuit.

15. A semiconductor arrangement for implementing a passive transponder with a tuned antenna resonant circuit, comprising a semiconductor component that includes an integrated circuit with a signal circuit part that is connected to a reference potential connection and a contact surface of said semiconductor component that is adapted to be connected to an antenna arrangement for said passive transponder, wherein said semiconductor component comprise:

an insulating layer;

a first conductive layer arranged on said insulating layer and forming said contact surface;

a second conductive layer arranged in said insulating layer and having a lateral extent greater than said first conductive layer;

a first semiconductor region of a first conductivity type that is arranged under said insulating layer and that is electrically connected to said second conductive layer;

a second semiconductor region of a second conductivity type arranged under said insulating layer;

a highly-doped third semiconductor region of the second conductivity type that is surrounded laterally and from below by said first semiconductor region; and a reference contact terminal connected to said reference potential connection and to said highly-doped third semiconductor region.

16. The semiconductor arrangement according to claim 15, wherein said first semiconductor region contacts and forms a Schottky diode junction with said second conductive layer.

17. The semiconductor arrangement according to claim 15, wherein said semiconductor component further comprises a fourth semiconductor region of the second conductivity type, which is surrounded laterally and from below by said first semiconductor region and which is interposed and electrically connected between said first semiconductor region and said second conductive layer.

18. The semiconductor arrangement according to claim 15, wherein a lateral distance between said reference contact terminal and a proximate edge of said second conductive layer is about 1 $\mu$m.

* * * * *

UNITED STATES PATENT AND TRADEMARK OFFICE
CERTIFICATE OF CORRECTION

PATENT NO.    : 6,952,560 B2
DATED         : October 4, 2005
INVENTOR(S)   : Feibig et al.

It is certified that error appears in the above-identified patent and that said Letters Patent is hereby corrected as shown below:

Title page,
Item [56], References Cited, U.S. PATENT DOCUMENTS, replace
"6,229,442 B1    5/2001    Rolin et al." with
-- 6,229,443 B1    5/2001    Roesner --;
FOREIGN PATENT DOCUMENTS, after "WO98/40846" replace "9/1990" with
-- 9/1998 --; delete the duplicate entry "WO 98/03938    1/1998";
OTHER PUBLICATIONS,
 "Klaus Finkenzeller," reference, after "Muenchen", replace "Wein" with -- Wien --;
after "2000,", replace "pp. 121" with -- pg. 121 --.

Column 5,
Line 22, after "diode" replace "DD1 D2" with -- DD1D2 --.

Column 6,
Lines 14-30, should read:
-- The layer structure shown in FIG. 3b presents an alternative embodiment, in which the Schottky diode DALB2D1 shown in FIG. 3a is replaced by a standard model of a diode DD2PD1, by an additional zone D2PP of the second conductivity type being arranged underneath the contact area of the metallic conductive layer ALB2. In place of the Schottky diode, a conventional diode is formed by the boundary surfaces of the zones D2PP and D1. This is advantageous if the metallization process within the manufacturing process does not allow the formation of a metal semiconductor junction, but good HF characteristics are nevertheless required. As a result of the small boundary surface of the doping zones D2PP and D1, the diode DD2PD1 has a low capacitance value. Moreover, the length of the zone D1 remains substantially unchanged. --.
Line 39, after "and a resistor" replace "RS3A" with -- RSA3 --.

UNITED STATES PATENT AND TRADEMARK OFFICE
CERTIFICATE OF CORRECTION

PATENT NO. : 6,952,560 B2
DATED : October 4, 2005
INVENTOR(S) : Feibig et al.

It is certified that error appears in the above-identified patent and that said Letters Patent is hereby corrected as shown below:

Column 10,
Lines 15-16, after "component" replace "comprise" with -- comprises --.
Lines 40-41, after "15," remove the paragraph break (return).

Signed and Sealed this

Twenty-eighth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,952,560 B2
APPLICATION NO. : 10/145160
DATED : October 4, 2005
INVENTOR(S) : Feibig et al.

It is certified that error appears in the above-identified patent and that said Letters Patent is hereby corrected as shown below:

Column 6,
Line 56, before "lies in series" replace "RS5A" by -- RSA5 --.

Signed and Sealed this

Fourth Day of July, 2006

JON W. DUDAS
*Director of the United States Patent and Trademark Office*